July 12, 1949. F. H. ALEXANDER 2,475,937
COMBINED KNIFE HOLDER AND SHARPENER
Original Filed April 25, 1945

INVENTOR.
Fred H. Alexander
BY
ATTORNEY

Patented July 12, 1949

2,475,937

UNITED STATES PATENT OFFICE 2,475,937

COMBINED KNIFE HOLDER AND SHARPENER

Fred H. Alexander, Brooklyn, N. Y.

Substituted for application Serial No. 590,203, April 25, 1945. This application July 28, 1948, Serial No. 41,017

5 Claims. (Cl. 76—87)

This invention relates to new and useful improvements in a combined knife holder and sharpener.

This is a substitute for my abandoned application filed on April 25, 1945, Serial Number 590,203.

More particularly, the invention proposes a knife holder which is characterized by a hollow body having a top wall with a slot through which the blade of a knife may be inserted. In this way the holder conveniently supports the knife so that it may be easily removed and replaced as desired. It is also proposed to provide said hollow body with a knife sharpener mounted therein and so arranged as to automatically sharpen the knife each time it is placed into, or removed from, the slot in said hollow body.

The invention contemplates supporting the knife sharpener upon a leaf spring, or other resilient element, which will urge the sharpener resiliently against the edge of the knife blade as it is inserted and removed from the holder.

The invention also proposes to so construct the knife holder that the blade is guided against the knife sharpener while it is being inserted and removed from said top slot.

The invention also contemplates a modified form. In this modified form it is proposed that the holder be adapted to support more than one knife at one time. A resilient means is also proposed which may be manually controlled and by which the pressure of the knife blade against the knife sharpener may be controlled.

Still further the invention proposes the construction of a combined knife holder and sharpener as briefly explained which may be manufactured and sold at a low cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
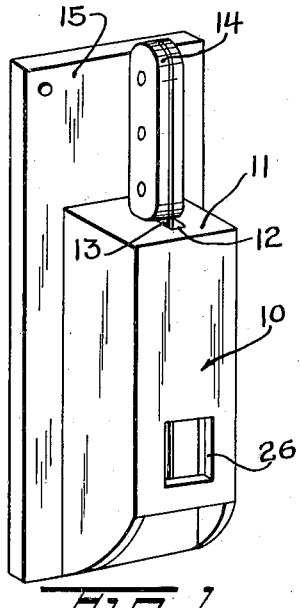
Fig. 1 is a perspective view of a combined knife holder and sharpener constructed in accordance with this invention and illustrated holding a knife.
Figure 2:
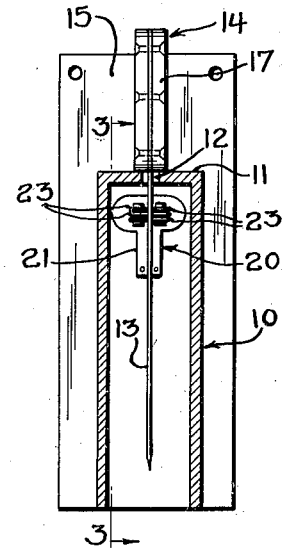
Fig. 2 is a transverse vertical sectional view taken directly behind the front wall of the body of the holder.
Figure 3:
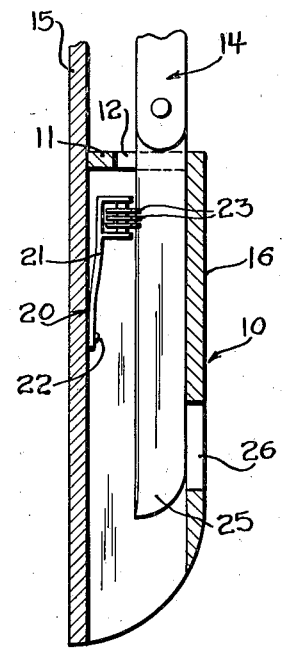
Fig. 3 is a fragmentary vertical sectional view taken on the line 3—3 of Fig. 2.

The combined knife holder and sharpener in accordance with that form of the invention illustrated in Figs. 1 to 3 inclusive, includes a hollow body 10 having a top wall 11 provided with a slot 12 through which the blade 13 of a knife 14 may be inserted and removed at will. The hollow body 10 is provided with a back flange 15 by which it may be mounted upon a wall, or other object. The body 10 is also provided with a front wall 16 adapted to guide the back edge of the knife blade 13 as it is being inserted and removed from the hollow body 10.

The slot 12 is sufficiently large to receive the blade 13 but is smaller than the handle 17 of the knife 14 so that the knife will be supported by its handle 17 resting at the top of wall 11 of the hollow body 10. The knife sharpener 20 is mounted within said hollow body 10 and is opposed to the front wall 16 and is adapted to sharpen said knife blade 13 each time the blade is placed into and removed from the hollow body 10. The sharpener 20 comprises a leaf spring 21 which is attached at its bottom end by fastening elements 22 upon the back wall of the hollow body. This leaf spring 21 extends upwards and supports several groups of sharpener discs 23.

The sharpener discs 23 are so arranged that the edge of the knife blade 13 will engage in the space between the discs 23 so that the edge of the knife will be sharpened as it is being moved upwards and downwards. The spring 20 is depended upon to provide the necessary pressure for holding the sharpener discs 23 against the edge of the knife blade 13. Preferably the blade 13 has a pointed bottom end 25 which will make it relatively easy for the edge of the blade to be guided between the sharpener discs 23 when the knife 14 is being inserted into the knife holder. The body 10 is provided with a window opening 26 through which the bottom portion of the knife blade 13 is viewable.

Figure 4:
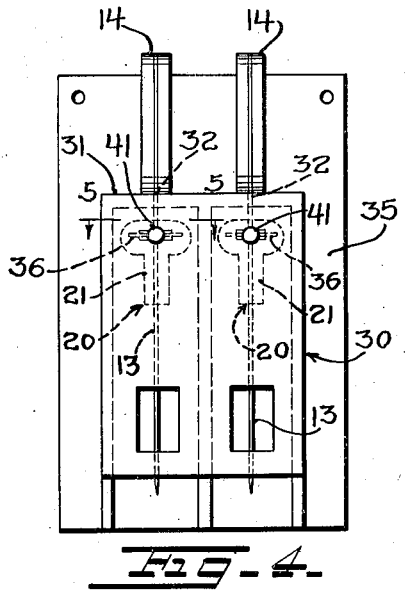
Fig. 4 is a front elevational view of a combined knife holder and sharpener constructed in accordance with a modified form of this invention.
Figure 5:
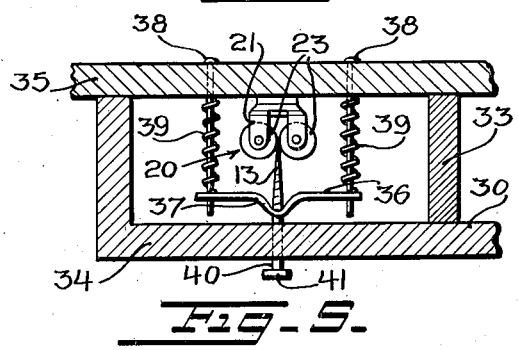
Fig. 5 is a fragmentary horizontal sectional view taken on the line 5—5 of Fig. 4.

In Figs. 4 and 5 a modified form of the invention has been disclosed which is similar to the prior form distinguishing essentially in the fact that the combined knife holder and sharpener is capable of holding more than one knife at a time. Furthermore, each sharpener has been associated with means by which the pressure of the knife blade against the sharpener discs may be manually controlled.

More specifically, this new and improved holder and sharpener includes a hollow body 30 having a top wall 31 provided with a group of slots 32 through which the blades 13 of knife 14 may be inserted and removed. The body 30 is divided by a partition 33 into different compartments, there being one compartment for each knife.

Each of the compartments of said body 30 has a front wall 34 for guiding the back edge of the blade of the knife. The body 30 has a back flange 35 by which it may be mounted on a wall or other object. Knife sharpeners 20 are mounted within each of the compartments of the body 30. These sharpeners are located at the tops of the compartments. Opposed to each sharpener 20 there is a strip of material 36 which is adapted to extend across the back of the knife blade 13. These strips 36 have bent portions 37 forming sockets for receiving the back edges of the blades 13.

The strips 36 are slidably mounted on pins 38 mounted on and projecting forward from the back wall of the hollow body 30. Small springs 39 are mounted upon the pins 38 and urge the strips 36 forward and against the front wall of the hollow body 30. Each strip 36 is provided with a non-circular shank 40 which extends through a complementary opening in the front wall 34 of the body 30. The shanks 40 are provided with heads 41 by which they may be manually pressed inwards.

The operation of this form of the invention is somewhat similar to the prior form. Each time a knife is inserted into and removed from the compartment of the holder it will be sharpened. The back edge of each knife blade 13 will be guided by the strips 36. The leaf springs 21 of the sharpeners 20 will force the sharpener discs 23 against the edge of the knife blade being sharpened.

If it is desired to increase the pressure of the discs 23 against the edge of a knife blade, the head 41 of the shank 40 may be pressed inwards while the knife blade is being moved. This presses inwards the strip 36 so that the strip in turn, engages the back of the knife blade, forcing the cutting edge of the knife blade against the sharpener discs 23 with increased pressure.

Figure 6:
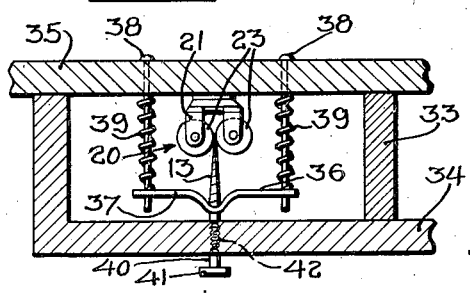
Fig. 6 is a fragmentary horizontal sectional view, corresponding to Fig. 5, but illustrating a further modification of the invention.

It is to be understood that the shank 40 may be threadedly engaged for instance, by a thread 42 as shown in Fig. 6, in the front wall 34 for retaining the edge of the knife blade 13 against the sharpener discs 23, at a constant fixed pressure.

While I have illustrated and described the preferred embodiments of my invention, it is to be understood that I do not limit myself to the precise constructions herein disclosed, and the right is reserved to all changes and modifications coming within the scope of the invention as defined in the appended claims.

Having thus described my invention, what I claim as new, and desire to secure by United States Letters Patent is:

1. A combined knife holder and sharpener, comprising a hollow body having a top wall with a slot through which the blade of a knife may be inserted, a front wall for guiding said knife blade, a knife sharpener mounted within said hollow body opposed to said front wall for sharpening said knife blade each time said knife blade is placed into or removed from said hollow body, comprising a leaf spring supported on said hollow body, a plurality of groups of sharpener discs mounted on said leaf spring to engage the edge of the knife blade, a strip within the hollow body for engaging across the back edge of the knife blade, means for slidably supporting said strip so that it is capable of moving forward, resilient means urging said strip rearwardly, a shank projecting from said strip through said front wall and provided with a knob by which the strip may be moved rearwardly, said strip having an offset socket portion for receiving the back edge of said knife blade.

2. A combined knife holder and sharpener, comprising a hollow body having a top wall with a slot through which the blade of a knife may be inserted, a front wall, a knife sharpener mounted within said hollow body opposed to said front wall for sharpening said knife blade each time said knife blade is placed into or removed from said hollow body, comprising a leaf spring supported on said hollow body, a plurality of groups of sharpener discs mounted on said leaf spring to engage the edge of the knife blade, a strip within the hollow body for engaging across the back edge of the knife blade, means for slidably supporting said strip so that it is capable of moving forward, resilient means urging said strip rearwardly, a shank projecting from said strip through said front wall and provided with a knob by which the strip may be moved rearwardly, said strip having an offset socket portion for receiving the back edge of said knife blade, said shank also including a threaded portion engaging in said front wall and adapted to retain said edge of the knife blade against said groups of sharpener discs at a constant fixed pressure.

3. In a knife holder and sharpener having a hollow body formed with a back wall, a front wall and a top wall formed with a slot for the insertion of a knife blade and a sharpener mounted on the back wall at a location to engage and sharpen the cutting edge of a knife blade when inserted into or removed from said slot, means for holding the knife blade in a position with its cutting edge engaged with said sharpener, comprising pins extended forwardly from the back wall on opposite sides of the sharpener, a strip of material slidable on said pins and extended across the back of the knife blade, springs on said pins operating between the adjacent faces of the back wall and said strip urging the strip away from the back of the knife blade, and means projecting from said strip through the front wall for urging said strip against the action of said springs to hold the cutting edge of the blade in engagement with the sharpener.

4. In a knife holder and sharpener having a hollow body formed with a back wall, a front wall and a top wall formed with a slot for the insertion of a knife blade and a sharpener mounted on the back wall at a location to engage and sharpen the cutting edge of a knife blade when inserted into or removed from said slot, means for holding the knife blade in a position with its cutting edge engaged with said sharpener, comprising pins extended forwardly from the back wall on opposite sides of the sharpener, a strip of material slidable on said pins and extended across the back of the knife blade, springs on said pins operating between the adjacent faces of the back wall and said strip urging the strip away from the back of the knife blade, and means projecting from said strip through the front wall for urging said strip against the action of said springs to hold the cutting edge of the blade in engagement with the sharpener, said strip being formed intermediate of its ends with a portion bent away from the knife blade forming a socket engaged by the back edge of the blade for guiding vertical movements of the knife blade.

5. In a knife holder and sharpener having a hollow body formed with a back wall, a front wall and a top wall formed with a slot for the insertion of a knife blade and a sharpener mounted on the back wall at a location to engage and sharpen the cutting edge of a knife blade when inserted into or removed from said slot, means for holding the knife blade in a position with its cutting edge engaged with said sharpener, comprising pins extended forwardly from the back wall on opposite sides of the sharpener, a strip of material slidable on said pins and extended across the back of the knife blade, springs on said pins operating between the adjacent faces of the back wall and said strip urging the strip away from the back of the knife blade, and means projecting from said strip through the front wall for urging said strip against the action of said springs to hold the cutting edge of the blade in engagement with the sharpener, said latter-mentioned means comprising a shank extending from said strip and slidably projected through the front wall, and a head on the outer end of said shank.

FRED H. ALEXANDER.

REFERENCES CITED

The following references are of record in the file of this patent:

UNITED STATES PATENTS

| Number | Name | Date |
|---|---|---|
| 621,342 | Holyland | Mar. 21, 1899 |
| 1,173,549 | Blair | Feb. 29, 1916 |
| 1,555,107 | Dorff | Sept. 29, 1925 |
| 1,861,683 | Branch | June 7, 1932 |
| 2,413,169 | Case | Dec. 24, 1946 |
| 2,425,571 | Simonson | Aug. 12, 1947 |
| 2,430,700 | Berman | Nov. 11, 1947 |
| 2,441,690 | Dirksen | May 18, 1948 |